United States Patent
Thakker et al.

(10) Patent No.: US 6,487,425 B1
(45) Date of Patent: Nov. 26, 2002

(54) METHOD AND SYSTEM FOR SWITCHING A MOBILE STATION FROM A LOW POWER LIMITED OPERATIONS MODE TO A NORMAL OPERATING MODE

(75) Inventors: Kaushal Thakker, Irving, TX (US); Janette Chen Lin, Dallas, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/422,673

(22) Filed: Oct. 21, 1999

(51) Int. Cl.[7] .................................................. H04B 1/38
(52) U.S. Cl. ...................... 455/574; 455/343; 455/404; 455/414; 455/127; 455/418; 340/7.36; 340/7.5
(58) Field of Search ................................ 455/343, 574, 455/404, 413, 418, 419, 414, 412, 127; 340/7.36, 7.5

(56) References Cited

U.S. PATENT DOCUMENTS 5,710,975 A  *  1/1998  Bernhardt ................. 455/38.3
5,842,141 A  *  11/1998  Vaihoja ..................... 455/574
6,236,674 B1  *  5/2001  Morelli ...................... 375/219

* cited by examiner

Primary Examiner—Lee Nguyen
Assistant Examiner—Eugene Yun

(57) ABSTRACT

A method of supporting a switch from a limited operations low power operating mode of a mobile station (50) to a normal operating mode of the mobile station (50) in a wireless network (40). The method comprising the step of causing the mobile station (50) to inform the network (40) that it is entering into a low power operating mode. The method further comprises. the steps of causing the mobile station (50) to enter the low power operating mode, and causing the network (40) to acknowledge that the mobile station (50) is in the low power operating mode. Calls is made to a number associated with the low power operating mode are terminated by causing the mobile station (50) to switch to the normal operating mode.

16 Claims, 4 Drawing Sheets

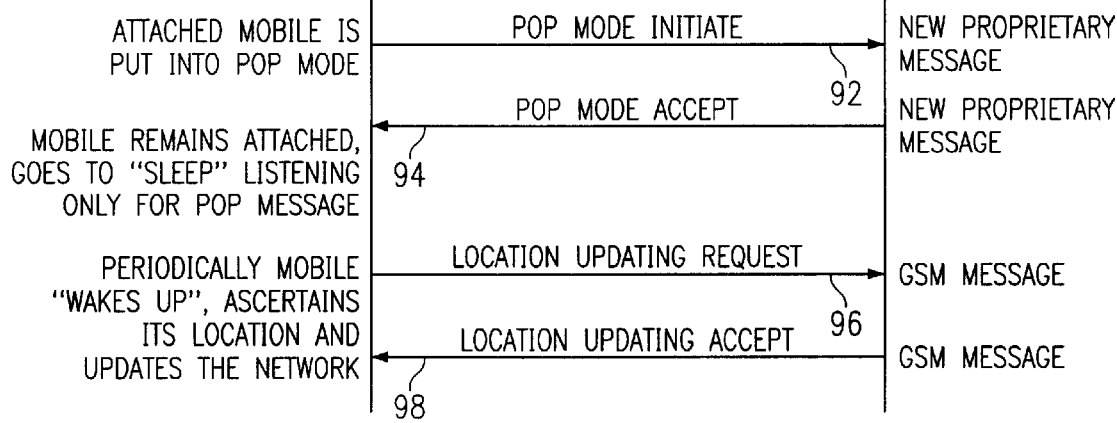

METHOD AND SYSTEM FOR SWITCHING A MOBILE STATION FROM A LOW POWER LIMITED OPERATIONS MODE TO A NORMAL OPERATING MODE

TECHNICAL FIELD

The invention relates generally to wireless communications and applications, and specifically to a method and system of supporting a switch from a low power to a normal operating mode of a mobile station utilizing the resources of a standard wireless network. More particularly, the present invention utilizes a number within a dual numbering scheme to transmit an A-interface message that causes a mobile station to power up from a limited operations low power mode to a normal operating mode of the mobile station.

BACKGROUND OF THE INVENTION

A wireless network supports roaming within a network coverage area by wireless service subscribers utilizing mobile stations (also known as mobile telephones) which provide subscriber access to the network. In general, the mobile station continuously utilizes battery power, with more drain during a call, and less drain when the mobile station unit is powered ON but not actively dedicated to a call. While batteries have become smaller and more efficient through the years, a major limitation of mobile station is their useful battery life which limits their use for extended periods of time.

At the same time, mobile stations are specially well suited for use during emergency situations since they are portable and can operate from anywhere within the network coverage area. Thus, from the perspective of the subscriber, her or she can just simply power ON the mobile station and make an outgoing call to request assistance. On the other hand, an individual may not be able to reach the subscriber if their mobile station is powered OFF.

Thus, the need to preserve battery life for outgoing calls originated by the subscriber limits their use for incoming calls during times of emergency. While voice mail systems are available and used to advise incoming callers that a subscriber is either out of range or can otherwise not be reached, they do not provide the subscriber with notice of incoming calls until accessed by the subscriber. Thus, with voice mail systems there is no guarantee that a family member or close friend would reach the subscriber during times of emergency. As such, present wireless systems do not provide a means of reaching a subscriber who has powered down his or her mobile station.

Prior wireless paging systems are known and disclosed in the art. For example, U.S. Pat. No. 5,701,337 to Silver (the '337 Patent) and U.S. Pat. No. 5,438,701 (the '701 Patent) to Yamaha discuss subject matter that bears some relation to matters discussed herein. Both prior art patents disclose mobile station and/or pager systems where a paging network is used to signal pager (or beeper) type device which can be built into the mobile station handset. These prior art paging systems, however, are not suited for use over the facilities of standard wireless communications networks such as a Global System for Mobile (GSM) using standard mobile station units. Nor are they well suited for reaching a subscriber who has turned OFF or powered down their mobile station. As such, the prior art wireless paging systems do not permit paging of a mobile station over the facilities of the GSM network or other standard wireless communication network.

Accordingly, what is needed is a method of utilizing the a mobile station during times of emergency that allows the subscriber to power OFF the mobile station to conserve battery life.

SUMMARY OF THE INVENTION

The present invention provides a method and telecommunications system of supporting a Power on Page ("POP") function for a mobile station in a standard wireless network such as GSM or PCS. With the present invention, a mobile station can be switched from a limited operations low power mode to a normal operating mode for accepting incoming calls. As such, the present invention makes it possible to reach a subscriber who has "almost powered off" his/her mobile station (also referred to as a mobile phone, handset or telephone) by transmitting a message to the mobile station that causes the mobile station to power ON fully to receive an incoming call. Preferably, a dual numbering scheme is utilized to assign a number associated with the low power operating mode of the mobile station. Calls placed to the number are detected by the network which, in turn, transmits a POWER-UP message to the mobile station.

As such, disclosed in one embodiment is a method of supporting a switch from a limited operations low power mode to a normal operating mode of a mobile station in a wireless network. The method comprises the steps of causing the mobile station to inform the network that it is entering into the low power mode and then causing the mobile station to enter the low power mode. The network is informed that the mobile station is entering the low power mode and an acknowledgment message can then be sent to the mobile station.

The method can also comprise the step of causing the network to ascertain that the mobile station is in the low power mode. When a call is made to a number associated with the low power mode, a command is sent to the mobile station requesting that it switch to normal operating mode. The mobile station receives the command and begins a power-up operation to normal operating mode. The method can also include the step of sending a successful POWER ON RESPONSE message to the network indicating that it is in its normal operating mode.

Also disclosed is a method of supporting a switch from a limited operations low power mode to a normal operating mode of an mobile station in a wireless network including at least one mobile station and one mobile switching center (MSC). The MSC is configured to communicate with the mobile station using an A-interface message. First and second MSISDNs (Mobile Station Integrated Services Digital Network) numbers can be used to switch the mobile station from a limited operations low power mode to a normal operating mode. At least one of the MSISDN numbers is associated with the limited operations low power mode so that a call placed to that MSISDN number initiates a mode switch of the mobile station. The method comprises the steps of causing the mobile station to inform the network that it is entering the limited operations low power mode and then causing the mobile station to enter a the limited operations low power mode.

In the limited operations low power mode, instead of powering OFF the mobile station, the subscriber places it in a mode that utilizes less power but maintains some critical communication functions. Thus, the mobile station will appear as if it is powered OFF, but it will not disconnect from the network. Instead, the mobile station will send a special new message to inform the network that it is going into this limited operations low power mode where the mobile station appears to be dormant to the subscriber. From then on, the mobile station will use just enough battery power to enable it to continuously listen for messages from the network and to update its location.

The network can send an acknowledgment to the mobile station by way of a new A-interface message. Positioning of the mobile station is performed periodically while in the limited operations low power mode but the mobile station, overall, uses less battery power to update its location. The network, in turn, sends a LOCATION UPDATE ACKNOWLEDGMENT message to the mobile station and all other functionality provided by the mobile station (incoming calls, short message service, display, signal strength determination, etc.) will be suppressed as though the mobile station is powered OFF.

The method can further comprise the step of detecting when a call is made to an MSISDN number associated with the normal operating mode of the mobile station. When a caller attempts to contact a subscriber who has put his mobile station in the limited operations low power mode, the network will ascertain that the mobile station is in this mode. the network can divert incoming calls placed to the subscriber's first MSISDN number to the subscriber's voice mail or, if the subscriber does not have voice mail, the network will return a message to the caller that the subscriber cannot currently be reached.

If a caller dials the second MSISDN number, the call is detected by the network and a message is transmitted to the mobile station at its last known location. The mobile station will receive the message and power itself ON to its normal operating mode. The network will then terminate the incoming call to the mobile station utilizing typical call setup functions. In this way, the second MSISDN number can be used to reach a subscriber who has placed their mobile station in a mode that conserves power. The assumption is that the subscriber will only reveal the second MSISDN number to select individuals for use during times of emergency.

Also disclosed is a telecommunications system capable of supporting the switch of a mobile station from a limited operations low power mode to a normal operating mode. The system comprises at least one mobile station capable of operating in both a limited operations low power mode and a normal operating mode. A wireless network capable of communicating with the mobile station is provided and includes a means of detecting when a call is placed within the wireless network to the mobile station and a means of storing at least two numbers for contacting a subscriber of the mobile station. One of the two numbers is associated with the limited operations low power mode, while the other number is associated with the normal operating mode of the mobile station. The wireless network is configured to detect when a call is placed to the number associated with the limited operations low power mode and then send a message to the mobile station that would cause the mobile station to switch from the limited operations low power mode to the normal operating mode.

A technical advantage of the present invention is the utilization of existing wireless network resources and facilities to provide a POP feature for mobile stations capable of operating in a limited operations low power mode as herein described.

Another technical advantage of the present invention is that the mobile station maintains basic critical functions, such as positioning while at the same time conserving battery life.

Still another technical advantage includes the use of dual numbering plans, such as those provided in GSM networks, to provide a POP feature for mobile stations.

BRIEF DESCRIPTION OF THE DRAWINGS

The above features and advantages of the present invention will be more clearly understood from consideration of the following detailed description taken in connection with accompanying drawings in which:

FIG. 6 illustrates the messaging sequence between the mobile station and network for entering and acknowledging Power-On-Paging (POP) feature according to one embodiment;

FIG. 7 illustrates the messaging sequence for an incoming call, according to one embodiment and the mobile station.

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
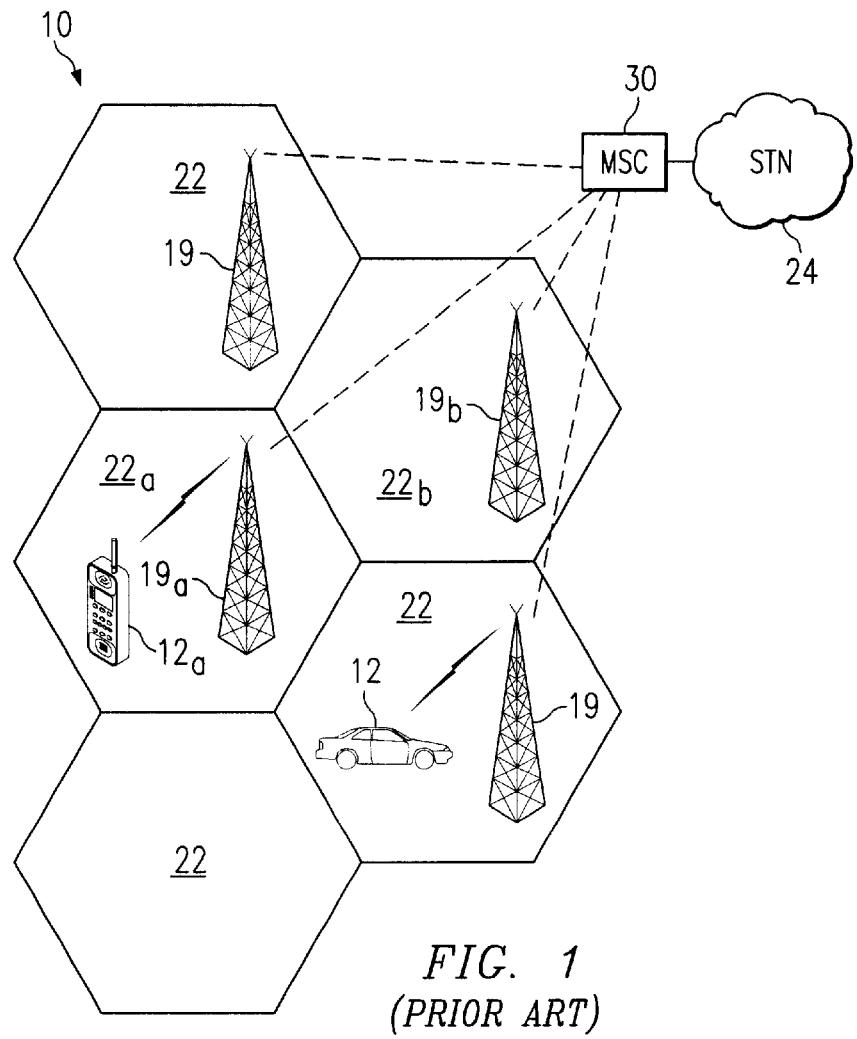
FIG. 1 illustrates the primary components of a wireless or cellular network in which the invention can be practiced.
Figure 2:
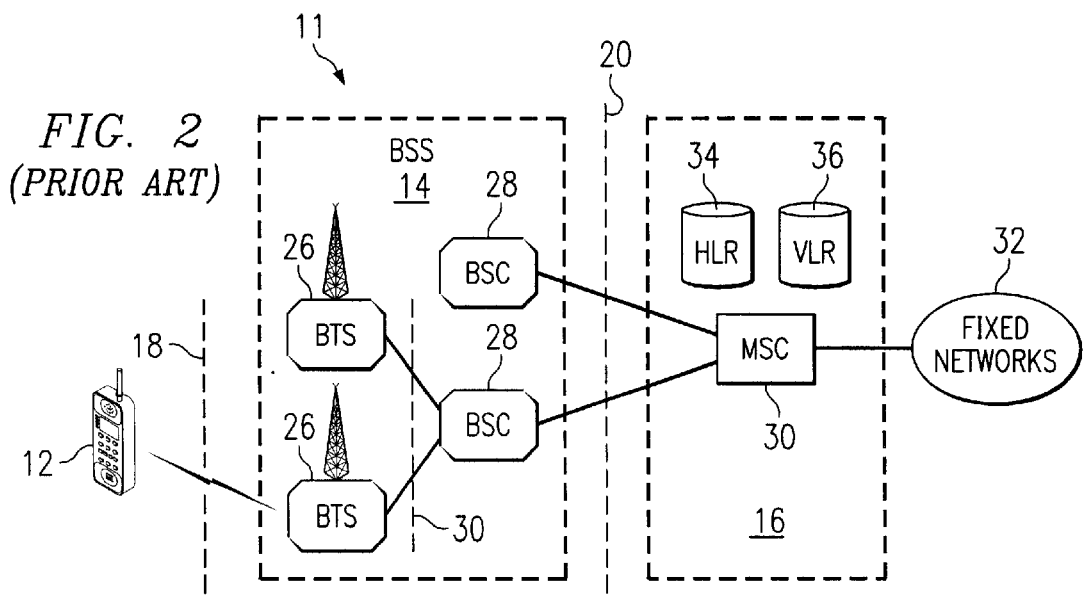
FIG. 2 illustrates a GSM network and its primary components.

To better understand the invention, reference is made to FIGS. 1 and 2, which illustrate wireless communications networks in which the invention can be practiced. In particular, the network 10 of FIG. 1 is representative of a broad class of cell-based wireless public land mobile networks (PLMNs). The network 10 is seen to include an originating Mobile Station (MS) 12, which can be a wireless communications device such as a Personal Communications Service (PCS) or mobile radio unit, mobile handset, or other similar wireless device, but may also include a computer, a Personal Digital Assistant (PDA) or other wireless terminal, for example. The MS 12 is often referred to as a mobile telephone or mobile phone.

A base station 19 provides cellular coverage via a radio frequency (RF) link to the MS 12 and other mobile stations with the cells 22 of network 10. Typically, several base stations 19 service a single MSC 30 through base station controllers (BSC) 28 to provide continuous geographical coverage. The coverage area of the network is shown to include several cells 22a and 22b. It should be understood, however, the cells are shown as hexagonal in shape for illustrative purposes and that any references to a single cell 22 apply equally as well to all cells 22a, 22b in the network 10 unless otherwise indicated.

As the MS 12 moves between a first cell 22a to a second cell 22b, service (a call or data transmission) is handed off from a first base station 19a servicing the MS 12a in the first cell 22a to a second base station 19b in the second cell 22b. As the MS 12a crosses the region serviced by the base station 19b in the second cell 22b, the MS 12a is arriving at the transfer of the communication from the first base station 19a to the second base station 19b (called a "handoff"). A hand-off is typically managed by control systems contained in the Mobile Switching Center (MSC) 30. MSC 30 is typically in communication with multiple BSCs 28, as well as to fixed networks, such as the Public Switched Telephone Network (PSTN) 24 or an optical network, for example.

A specific type of wireless network is illustrated in FIG. 2 which shows the primary components of a Global System for Mobile (GSM) Communications network (GSM network) 11 as including three main parts: a MS 12, a Base Station Subsystem (BSS) 14, and network subsystem 16. The network subsystem 16 includes a MSC 30 that performs the call switching functions between network users as well as mobility management. The MS 12 and the BSSs 14 communicate with one another across an interface 18, known as the air interface, also referred to as radio link or Um interface. Furthermore, the BSS 14 communicates with the MSC 30 of network subsystem 15 across an A-interface 20 by transmitting A-interface messages. The MSC 30 also acts as the interface or gateway to other fixed networks 32 which may be the PSTN or other cellular networks, for example.

The MS 12 usually includes a mobile transceiver and a Subscriber Identity Module (SIM). The SIM may include an identity indicator (a "secret" key for authentication), and other relevant network/user information. The mobile transceiver itself is uniquely identified by the International Mobile Equipment identify (IMEI-typically, a telephone number). The identification features of the MS 12 are independent, thereby allowing mobility of the subscriber about the service area of the GSM network 11.

The BSS 14 typically comprises two parts: the Base Transceiver Station (BTS) 26 (commonly called a base station), and the Base Station Controller (BSC) 28. The BTS 26 communicates across a standardized Abis interface 30 with BSC 28, allowing operation between components. BTS 26 houses radio transceivers that communicates across a cell 22, and the BTS 26 handles the radio-link protocols that facilitate communication with the mobile station 12. BSC 28 manages the radio resources for one or more BTSs 27, and, likewise, there may be several BSCs 28 within a single BSS 14. BSC 28 provides a communications platform between the mobile station 12 and the MSC 30 of network subsystem 16 which acts as an interface to one or more fixed networks 32. Among the other functions of the BSC 28 are radio-channel setup, frequency hopping, and handovers.

The central component of the network subsystem 16 is the MSC 30, which mirrors the performance of a normal switching node of the PSTN, and provides all of the functionality needed to handle mobile subscriber communications, such as registration, authentication, location updating, handovers, and call routing to roaming subscribers. These functions are provided in conjunction with several other network entities which include the Home Location Register (HLR) 34 and Visitor Location Register (VLR) 36.

The HLR 34 and VRL 36, together with the MSC 30, provide call routing and roaming capabilities for the GSM network 11. In particular, the HLR 34 contains administrative information of the subscriber registered in the corresponding GSM network 11, along with the current location of the mobile handset 12. Likewise, the VLR 36 contains selected administrative information from a MS's HLR 34 necessary for call control and provisioning of the subscriber services for each mobile currently located in the geographical area controlled by the VLR 36. Other registers are used for authentication and security functions within the network subsystem 16.

In GSM and other wireless network topologies, the telephone number of the subscriber's MS 12 is registered with the HLR 34. This number is typically assigned by the service provider specifically for a specified MS. In GSM terms, the number is referred to as the Mobile Station Integrated Services Digital Network or MSISDN number. As is known to those of ordinary skill, GSM and other networks are supporting dual numbering plans wherein two (2) MSISDN numbers can be assigned to a single MS 12.

Figure 3:
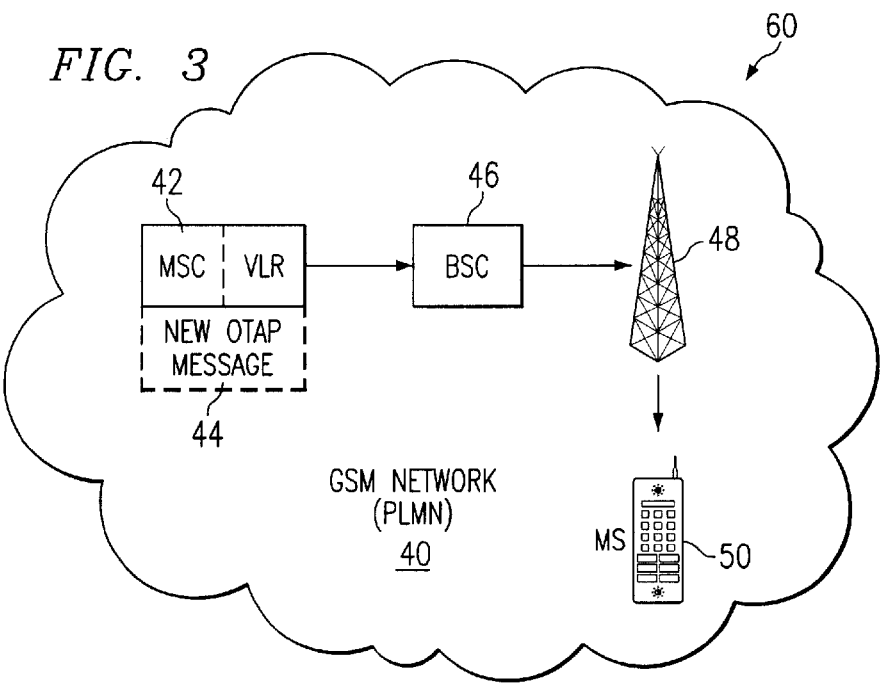
FIG. 3 shows a telecommunications system with a GSM network adapted for supporting the Power-On-Page feature of the present invention.

The invention utilizes such dual numbering plan networks to provide a means of implementing a POWER-ON-PAGE (POP) feature for mobile stations operating within standard wireless network, such as GSM or PCS. The mobile station would be configured to operate in a limited operations low power mode and the network would cause the mobile station to switch to a normal operating mode by transmitting a POP message to the mobile station. With reference to FIG. 3, therein is shown a telecommunications system, denoted generally as 60, that supports a switch from a limited operations low power mode to a normal operating mode of a MS 50 according to the present invention.

The telecommunication system 60 is seen to include a PLMN or GSM network 40 adapted to communicate with the MS 50 and to cause it to switch from a limited operations low power mode to a normal operating mode when a call placed to an MSISDN number associated with the limited operations low power mode is detected. The GSM network 40 uses standard wireless signaling protocols between the MS 50 and the MSC 42 to detect, for instance, if the subscriber has placed the MS 50 in the limited operations low power mode and to transmit A-interface messages to the MS 50 which carry the POP message. The POP message is received by the MS 50 and used to switch to a normal operating mode of the MS 50.

As such, the MSC 42 is configured to provide a new A-interface message 44 that instructs the MS 50 to switch from the limited operations low power mode to a normal operating mode. The A-interface message provides direct communications between the MS 50 and the MSC 42 or between the MSC 42 and the BSC 46. This provides a mechanism within the network PLMN for direct interface between different elements in the GSM network 40.

Figure 4:
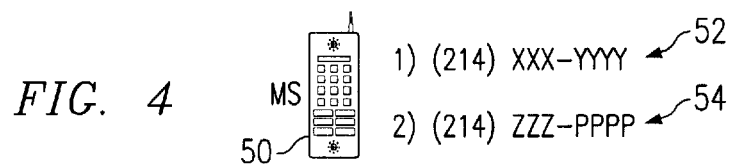
FIG. 4 illustrates a mobile station adapted for supporting a limited operations low power mode according to the present invention.

With reference to FIG. 4, the MS 50 of the present invention is adapted for use with two (2) MSISDN numbers 52 and 54. As is appreciated by those skilled in the art, dual numbering schemes are available in most GSM or PCS networks. One of the MSISDN numbers 52 corresponds to the standard number utilized to contact the subscriber of the MS 50. To support the limited operations low power mode, a subscriber is assigned a second MSISDN number 54 to a respective MS 50.

Thus, the first MSISDN number 52 is available to every caller attempting to contact the subscriber at his or her MS 50. The second MSISDN number 54 acts as the "Power On Number" for the MS 50. Thus, a subscriber can select and be assigned a second MSISDN number 54 by the service provider available for use in "walking" up the MS 50 from the low power limited operations mode.

Figure 5:
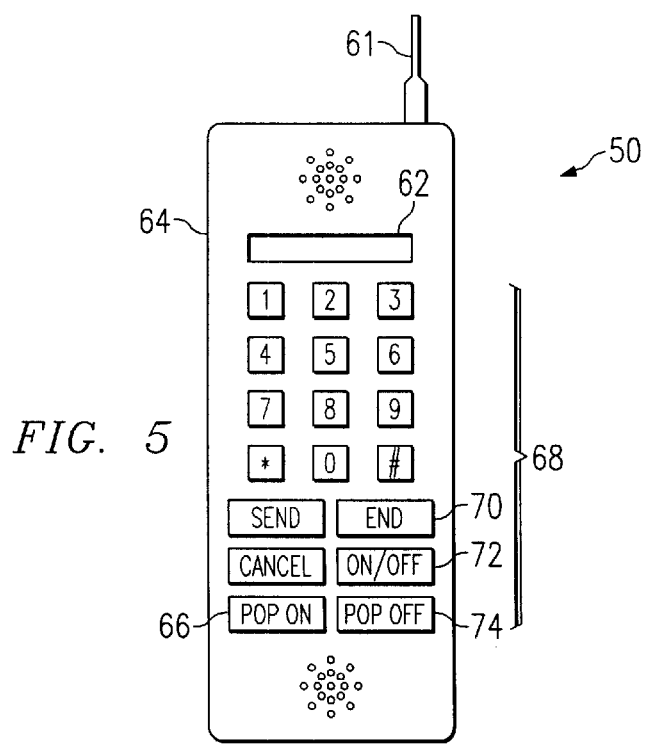
FIG. 5 is a front elevational view of a mobile station of the present invention, according to one embodiment.

The invention contemplates the use of a new MS 50 capable of supporting a low power operations mode as described herein. Referring to FIG. 5, therein is shown a front elevational view of such an MS 50, according to one embodiment of the present invention. The MS 50 includes a base 64, an on/off switch 72, a keypad 68, and end button 70, an antenna 61, a POP ON button 66, a POP OFF button 74 and a display 62. The ON/OFF switch 72 may be implemented as a button on the keypad 68, but may also utilize other types of switches or switching mechanisms. The keypad 68 may be utilized by a user to input digits corresponding to a number to be called. The display 62 may be a Liquid Crystal Display (LCD) such as those widely used on mobile stations. Additionally, the MS 50 may be a portable mobile device carried by the subscriber, a mobile care phone, or other type of similar wireless device. The MS 50 may also be provided with other features and accessories without departing from the scope of the present invention.

In general, the POP ON button 66 can be used by a subscriber to place the MS 50 into the limited operations low power mode described herein. The MS 50 can be configured to send a message to the network 60 informing the network 60 that it is entering the lower power limited operations mode.

Referring to FIG. 6, a diagram of the POP feature messaging sequence, according to one embodiment, is illustrated and denoted generally as 90. The POP messaging sequence 90 begins as soon as the subscriber places the MS 50 in the limited operations low power mode by, for example, depressing the POP ON button 66. The MS 50 will send the GSM network 40 and A-interface message 44 indicating that POP mode has been initiated as shown by signal sequence 92.

The MSC 42 will then recognize that the MS 50 wants to enter POP mode and returns a POP mode acknowledgment message,.at signal sequence 94. Alternatively, the GSM network 40 could reject POP mode activation by the MS 50. For example, if the MSC 42 is in an error mode, it can send back a reject acknowledgment. The user will then know that it could not switch to the POP mode due to, for example, no roaming availability or the roaming operator does not want to allow this service for non-network subscribers.

Once the GSM network 40 has sent a POP mode acknowledgment message (at signal sequence 94) to the MS 50, the MS 50 will remain in the limited operations low power mode, listening only for POP messages from the GSM network 40. While in POP mode, the MS 50 operates using minimal power where, for example, only critical operations are maintained and the display is blank and no outgoing calls are made unless POP mode is disabled, using the POP OFF button 74, for example.

Regardless of the amount of power utilized by the MS 50 during limited operations low power, the MS 50 continues to perform a few critical functions. For example, the MS 50 is responsible to inform the network 40 of its location as illustrated by the location update request signal sequence 96. Thus, the MS 50 powers up periodically in order to ascertain its location and update the network 40. This positioning is performed by allowing the MS 50 to send a LOCATION UPDATE REQUEST message to the GSM network 40. The GSM network 40, in turn, sends a LOCATION UPDATING ACCEPT message at signal sequence 98, to the MS 50. By continuously updating the location of the MS 50 in the GSM network 40, a subscriber may be reached, even while the MS 50 is in POP mode.

Now that the POP mode initiation sequence has been described, reference is made to FIG. 7 which illustrates the messaging sequence for the detection of incoming calls once the MS 50 has been placed in POP mode. The messaging sequence, denoted generally as 110, begins when the MSC 42 within the GSM network 40 receives an incoming call 72. The MSC 42 is configured to detect whether the incoming call 72 is placed to the MSISDN number corresponding to the normal operating mode of the MS 50 or to the MSISDN number corresponding to the limited operations low power mode of the MS 50.

If the incoming call 72 is to the MSISDN number associated with the limited operations low power mode of the MS 50, then the GSM network 40 generates and transmits a POP message for the MS 50. In one embodiment, the message comprises a new proprietary message format which is formed and transmitted as an A-interface message stream to the MS 50. The availability and use of dual MSISDN numbering schemes facilitate this implementation.

The proprietary message or A-interface message is transmitted during the POP signal sequence 112. If the MS 50 receives the POP message from the GSM network 40, then the MS 50 is capable of switching to a normal operating mode wherein normal levels of power are utilized by the MS 50. In this way, a call to the MSISDN number associated with the limited operations low power mode of the MS 50 causes the MS 50 to switch to normal operating mode.

The MS 50 is capable of acknowledging a transition to normal operating power levels by transmitting a POWER ON SUCCESSFUL ACKNOWLEDGMENT message, as illustrated in signal sequence 114 to the network 40. At this point, since the MS 50 is operating under normal conditions, the network 40 is able to terminate the call to the second MSISDN number using well known call setup and confirmation functions, e.g. paging 116. The presence of a normal terminated call is illustrated by signal sequence 118.

The present invention contemplates the use of a dual MSISDN numbering scheme wherein two MSISDN numbers are assigned to a single MS 50. A first MSISDN number would correspond to normal operating conditions of the MS 50 with normal power levels. The second MSISDN number would be used by the subscriber to permit the MS 50 to operate in a limited operations low power mode of the MS 50. The first and second MSISDN numbers can be stored as a record in the HLR 34, accessible by the MSC 42 for implementing the POP mode feature as herein described. In this manner, the MSC 42 is capable of detecting an incoming call to the second MSISDN number.

Figure 8:
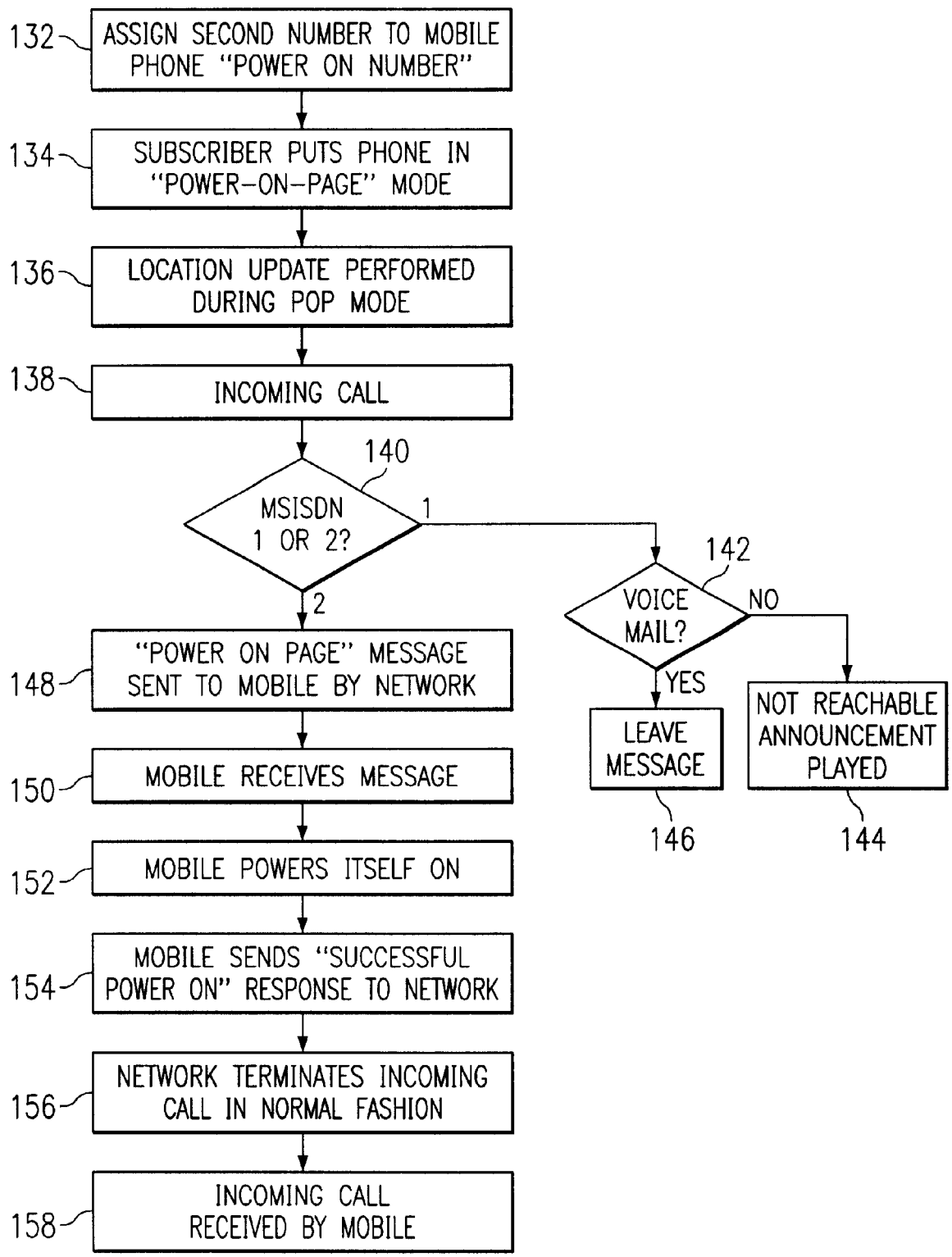
FIG. 8 is a process flow diagram of a method of supporting a switch from a limited operations low power mode to a normal operating mode of a mobile station, according to one embodiment.

With reference to FIG. 8, therein is shown a process flow diagram for a method of enabling the POP feature of the present invention. The method, denoted generally as 130, begins when a second MSISDN number is assigned to an MS 50 within the network 40 (step 132). Next, the subscriber places the MS 50 in POP mode by, for example, depressing the POP ON button 66 (step 134). During the period when an incoming call is not made to the MS 50, the MS 50 performs periodic locations updates (step 136). Once an incoming call is detected (step 138), the MSC 42 determines whether it is placed to the MSISDN number 1 or MSISDN number 2 (step 140). If the incoming call is placed to the first MSISDN, then the process flow is directed to step 142 wherein the call si switched to a subscriber voice mail system (step 146), if any, or an announcement indicating the subscriber cannot be reached (step 144).

Where the incoming call is to the second MSISDN number (as determined in step 140), then process flow is directed to step 148 wherein the network formats and transmits a POP message to the MS 50 to initiate a switch by the MS 50 to normal full power operating mode. Thus, the MS 50 receives the POP message (step 150) and powers itself ON (step 152) prior to termination of the incoming call (step 138) wherein the network 40 performs normal call setup functions.

In one embodiment, the MS 50 sends a SUCCESSFUL POWER ON ACKNOWLEDGMENT message to the network 40 (step 154). At this point, the network 40 is ready to assign the incoming call to a channel utilized by the MS 50 and the incoming caller. Next, the network 40 is able to terminate the incoming call (step 138) in a normal fashion (step 156) so that the incoming call is received by the MS 50 (step 158) using well known call setup and channel assignment methods for the network 40. Termination of the incoming call may result in some latency, to permit the MS 50 to "wake" from the limited operations low power mode.

While the invention has been described in connection with preferred embodiments, it should be understood that the description is not intended to be construed in a limiting sense. Various modifications and combinations of the illustrative embodiments as well as other embodiments of the invention will be apparent to persons of ordinary skill in the art upon reference to this description.

What is claimed is:

1. In a GSM wireless network including at least one mobile station and one mobile switching center (MSC), said MSC configured to communicate with said mobile station using A-interface messages, said MSC further adapted to support first and second MSISDN numbers, said first MSISDN number associated with a normal operating mode and said second MSISDN number associated with a limited operations low power mode of said mobile station, a method of supporting a switch from the limited operations low power mode to a normal full power operating mode of the mobile station, the method comprising steps of:

causing the mobile station to inform the network that it is entering into said limited operations low power mode;

causing the mobile station to enter said limited operations low power mode;

detecting when a call is made to the second MSISDN number; and formatting and sending an A-interface message to the mobile station requesting that it switch to a normal operating mode.

2. The method of claim 1 wherein said informing step further comprises the step of sending ACKNOWLEDGMENT message to the mobile station.

3. The method of claim 1 wherein said informing step is followed by the step of ascertaining the location of said mobile station.

4. The method of claim 3 wherein said ascertaining step is performed periodically while said mobile station is in said limited operations low power mode.

5. The method of claim 3 wherein said ascertaining step is performed by said mobile station transmitting a location update request to said network.

6. The method of claim 3 wherein said ascertaining step further comprises the step of sending a location update acknowledgment from said network to said mobile station.

7. The method of claim 3 wherein said ascertaining step further comprises the step of sending a location update acknowledgment from said network to said mobile station.

8. The method of claim 1 wherein said detecting step further comprises the step of detecting when a call is made to said first MSISDN number associated with the normal operatinhg mode of said mobile station.

9. The method of claim 1 wherein said sending step furhter comprises the step of powering ON said mobile station for use in said normal operating mode.

10. The method of claim 1 wherein said sending step further comprises the step of said mobile station sending a successful Power On Response to said network in the form of an A-interface message.

11. A telecommunications system capable of supporting the switch of a mobile station from a limited operations low power mode to a full power normal operating mode, said system comprising:

at least one mobile station capable of operating in both said limited operations low power mode and said full power normal operations mode;

a public land mobile network (PLMN) capable of communicating with said mobile station, said PLMN further comprising:

a means of detecting when a call is placed within the wireless network said mobile station; and a means of storing at least two numbers for contacting a subscriber of said mobile station, the first of said two numbers associated with said limited operations low power mode, the second of said two numbers associated with said full power normal operating mode;

wherein said PLMN is further configured to detect when a call is placed to said second of said two numbers and to send a message to said mobile station causing said mobile station to switch from said limited operations low power mode to said normal operating mode.

12. The telecommunications system of claim 11 wherein said PLMN is a GSM network.

13. The telecommunications system of claim 11 wherein said mobile station is further adapted to send a message to said wireless network informing it that is entering said limited operations low power mode.

14. The telecommunications system of claim 13 wherein said PLMN is further adapted to send an ACKNOWLEDGMENT message to said mobile station.

15. The telecommunications system of claim 11 wherein said two numbers are MSISDN numbers.

16. The telecommunications network of claim 11 wherein said PLMN is further adapted to detect calls placed to said second number and, while said mobile station is in said limited operations low power mode to direct said calls to a voice mail system.

* * * * *